United States Patent
Engle et al.

(10) Patent No.: US 11,205,188 B1
(45) Date of Patent: Dec. 21, 2021

(54) AUTOMATICALLY PRESENTING E-COMMERCE OFFERS BASED ON BROWSE HISTORY

(71) Applicant: Capital One Services, LLC, McLean, VA (US)

(72) Inventors: Ryan Engle, Austin, TX (US); Jonathan Coon, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 84 days.

(21) Appl. No.: 15/997,276

(22) Filed: Jun. 4, 2018

Related U.S. Application Data (60) Provisional application No. 62/516,563, filed on Jun. 7, 2017.

(51) Int. Cl.
  *G06Q 30/02* (2012.01)
  *G06Q 30/06* (2012.01)
  *G06F 16/9535* (2019.01)

(52) U.S. Cl.
  CPC ..... *G06Q 30/0224* (2013.01); *G06Q 30/0222* (2013.01); *G06Q 30/0225* (2013.01); *G06Q 30/0625* (2013.01); *G06Q 30/0631* (2013.01); *G06Q 30/0633* (2013.01); *G06Q 30/0641* (2013.01)

(58) Field of Classification Search
  None
  See application file for complete search history.

(56) References Cited

U.S. PATENT DOCUMENTS

| 8,065,195 B2 | 11/2011 | Tarvydas et al. |
| 8,577,749 B2 | 11/2013 | Aliabadi et al. |
| 8,600,931 B1 | 12/2013 | Wehrle et al. |
| 8,775,275 B1 | 7/2014 | Pope |

(Continued)

FOREIGN PATENT DOCUMENTS

| WO | 2008121737 | 10/2008 |
| WO | 2009061399 | 5/2009 |

(Continued)

OTHER PUBLICATIONS

Broida, Rick. "Use Honey to save money on Amazon purchases" CNET, Jun. 22, 2016 [online], [retrieved on Mar. 16, 2020], Retrieved from the Internet: <URL: https://www.cnet.com/how-to/use-honey-to-save-money-on-amazon-purchases/> (Year: 2016).*

(Continued)

*Primary Examiner* — Bion A Shelden
(74) *Attorney, Agent, or Firm* — Bookoff McAndrews, PLLC (57) ABSTRACT

Techniques are described for automatically extracting items from a user's browse history on one or more e-commerce websites, and automatically searching other e-commerce websites and sources for offers (including coupons, deals, and/or promotions) for those items and/or related items and/or stores. Such automated techniques allow users to gain the benefit of online offers from various sources, without having to go through the effort of manually searching for such offers. Instead, the system and method automatically locate such offers based on the user's browse history, without requiring any action to be taken on the part of the user.

42 Claims, 5 Drawing Sheets

(56) References Cited

U.S. PATENT DOCUMENTS

| | | | |
|---|---|---|---|
| 8,881,303 B2 | 11/2014 | Liu et al. | |
| RE45,371 E | 2/2015 | Simons | |
| 9,189,811 B1 | 11/2015 | Bhosle et al. | |
| 9,208,510 B1* | 12/2015 | Bonalle | G06Q 30/02 |
| 9,626,688 B2 | 4/2017 | King | |
| 9,639,853 B2 | 5/2017 | Shiffert et al. | |
| 9,766,922 B2 | 9/2017 | Amershi et al. | |
| 9,798,528 B2 | 10/2017 | Gao et al. | |
| 9,892,099 B2 | 2/2018 | Cao | |
| 9,953,335 B2 | 4/2018 | Shiffert et al. | |
| 9,965,769 B1 | 5/2018 | Shiffert et al. | |
| 2002/0087883 A1 | 7/2002 | Wohlgemuth et al. | |
| 2005/0165789 A1 | 7/2005 | Minton et al. | |
| 2006/0242266 A1 | 10/2006 | Keezer et al. | |
| 2007/0180380 A1 | 8/2007 | Khavari et al. | |
| 2008/0005079 A1 | 1/2008 | Flake et al. | |
| 2008/0098300 A1 | 4/2008 | Corrales et al. | |
| 2008/0189190 A1 | 8/2008 | Ferber | |
| 2009/0182643 A1 | 7/2009 | Holstein et al. | |
| 2009/0313352 A1 | 12/2009 | Dupont | |
| 2010/0121810 A1 | 5/2010 | Bromenshenkel et al. | |
| 2010/0131441 A1* | 5/2010 | Gruenhagen | G06F 16/337 706/45 |
| 2010/0161400 A1* | 6/2010 | Snodgrass | G06Q 30/02 705/14.16 |
| 2010/0241518 A1 | 9/2010 | McCann | |
| 2011/0088036 A1 | 4/2011 | Patanella | |
| 2011/0136516 A1 | 6/2011 | Ellis | |
| 2012/0011431 A1 | 1/2012 | Mao | |
| 2012/0198342 A1 | 8/2012 | Mahmud | |
| 2012/0265637 A1 | 10/2012 | Moeggenberg | |
| 2013/0132178 A1* | 5/2013 | Masuko | G06Q 30/0217 705/14.19 |
| 2013/0138495 A1* | 5/2013 | Lemphers | G06Q 30/0222 705/14.26 |
| 2013/0151381 A1 | 6/2013 | Klein | |
| 2013/0185155 A1* | 7/2013 | Colando | G06Q 30/0256 705/14.54 |
| 2013/0191723 A1 | 7/2013 | Pappas et al. | |
| 2013/0311286 A1* | 11/2013 | Detwiler | G06Q 30/0255 705/14.54 |
| 2014/0052571 A1* | 2/2014 | Raman | G06Q 30/0633 705/26.8 |
| 2014/0100991 A1 | 4/2014 | Lenahan et al. | |
| 2014/0189519 A1* | 7/2014 | Powell | G06F 16/955 715/736 |
| 2014/0195323 A1* | 7/2014 | Hankins | G06Q 30/0633 705/14.27 |
| 2014/0229258 A1 | 8/2014 | Seriani | |
| 2014/0229335 A1 | 8/2014 | Chen | |
| 2014/0236699 A1* | 8/2014 | Gupta | G06Q 30/0235 705/14.35 |
| 2014/0244386 A1* | 8/2014 | Mathur | G06Q 30/0255 705/14.53 |
| 2014/0244429 A1 | 8/2014 | Clayton et al. | |
| 2014/0257999 A1* | 9/2014 | Garcia-Martinez | G06Q 30/0275 705/14.71 |
| 2014/0281918 A1 | 9/2014 | Wei et al. | |
| 2015/0170178 A1* | 6/2015 | Chauhan | G06Q 30/0211 705/7.32 |
| 2015/0193821 A1* | 7/2015 | Izumori | G06Q 30/0257 705/14.53 |
| 2015/0220979 A1* | 8/2015 | Ouimet | G06Q 30/0251 705/14.49 |
| 2016/0063595 A1 | 3/2016 | Oral et al. | |
| 2016/0191351 A1 | 6/2016 | Smith et al. | |
| 2016/0379270 A1* | 12/2016 | Shah | G06Q 30/0269 705/14.66 |
| 2017/0103102 A1 | 4/2017 | Alison et al. | |
| 2017/0104841 A1 | 4/2017 | Duke et al. | |
| 2017/0171311 A1 | 6/2017 | Tennie et al. | |
| 2017/0277764 A1 | 9/2017 | Osotio | |
| 2018/0033072 A1* | 2/2018 | Karthikeyan | G06Q 30/0633 |
| 2018/0089737 A1 | 3/2018 | Ali et al. | |
| 2018/0268073 A1* | 9/2018 | Wang | H04L 67/22 |

FOREIGN PATENT DOCUMENTS

| | | |
|---|---|---|
| WO | 2017062678 | 4/2017 |
| WO | 2017062680 | 4/2017 |

OTHER PUBLICATIONS

Wikibuyhelp. "Is Wikibuy safe?" linustechtips, Feb. 24, 2016 [online], [retrieved on Mar. 16, 2020], Retrieved from the Internet: <URL: https://linustechtips.com/main/topic/553979-is-wikibuy-safe/> (Year: 2016).*

Lyons-Makaimoku, Laurie. "From Contacts to Coupons Austin Entrepreneur Creates New Online Pricing Tool" Austin.com, Mar. 18, 2016 [online], [retrieved on Mar. 16, 2020]. Retrieved from the Internet: <URL: https://austin.com/contacts-coupons-austin-entrepreneur-creates-new-online-pricing-tool/> (Year: 2016).*

Schultz, "NBA Data Scraping—Game Data", 2015.

Reda, "Web Scraping 201: Finding the API", 2015.

Moore, "Nylon Calculus 101: Data Scraping with Python", 2015.

* cited by examiner

AUTOMATICALLY PRESENTING E-COMMERCE OFFERS BASED ON BROWSE HISTORY

CROSS-REFERENCE TO RELATED APPLICATIONS

The present application claims the benefit of U.S. Provisional Application Ser. No. 62/516,563 for "Automated Product History Analysis", filed Jun. 7, 2017, which is incorporated by reference herein in its entirety.

The present application is related to U.S. Utility application Ser. No. 15/898,435 for "Passive User-Generated Coupon Submission," filed Feb. 17, 2018, which is incorporated by reference herein in its entirety.

The present application is related to U.S. Utility application Ser. No. 15/677,951 for "Automated Testing of Multiple Online Coupons," filed Aug. 15, 2017, which is incorporated by reference herein in its entirety.

The present application is related to U.S. Utility application Ser. No. 14/933,173 for "Universal Electronic Shopping Cart," filed Nov. 5, 2015, which is incorporated by reference herein in its entirety.

TECHNICAL FIELD

The present document relates to techniques for automatically identifying offers, including deals and promotions, that may be relevant to an ecommerce consumer, based on the consumer's browse history at an e-commerce website.

DESCRIPTION OF THE RELATED ART

Online shoppers are often interested in finding offers (including coupons, deals, and/or promotions) that can maximize their savings on online purchases, with a minimum of effort. Such offers can typically be found at a number of different websites and may be available from a number of different sources; it can therefore take significant effort on the part of a consumer to find such offers. In addition, some offers found on websites may be invalid or may have expired before use, or may have restrictions preventing their use for a particular purchase. Manually seeking out offers from various sources, testing such offers on a particular order, and keeping track of which offers are valid and usable, can be cumbersome and unreliable. As a result, many users fail to obtain the best prices on items they purchase online.

SUMMARY

According to various embodiments, techniques are described for automatically extracting items from a user's browse history on one or more ecommerce websites, and automatically searching other e-commerce websites and sources for offers (including coupons, deals, and/or promotions) for those items and/or related items, and/or for stores related to those items.

Such automated techniques allow users to gain the benefit of online offers from various sources, without having to go through the effort of manually searching for such offers. Instead, the system and method automatically locate such offers based on the user's browse history, without requiring any action to be taken on the part of the user.

The described techniques can be used in the context of a universal electronic shopping cart, as described in the above-referenced U.S. Utility application Ser. No. 14/933,173, so as to automatically identify offers in connection with a user's browse history using the universal cart. Alternatively, the described techniques can be implemented in other contexts.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

Although described herein in terms of tangible goods, the system and method can be implemented for any type of online purchases, including for example services, travel, event tickets, media and entertainment content, and/or the like.

System Architecture

According to various embodiments, the system can be implemented on any electronic device or devices equipped to receive, store, and present information. Such electronic devices may include, for example, desktop computers, laptop computers, smartphones, tablet computers, smart watches, wearable devices, and/or the like.

Although the system is primarily described herein in connection with an implementation in a client/server context wherein the client is a computer, one skilled in the art will recognize that the techniques described herein can be implemented in other contexts, and indeed in any suitable device or devices capable of receiving and/or processing user input, and/or communicating with other components over an electronic network. Accordingly, the following description is intended to illustrate various embodiments by way of example, rather than to limit scope.

Figure 1:
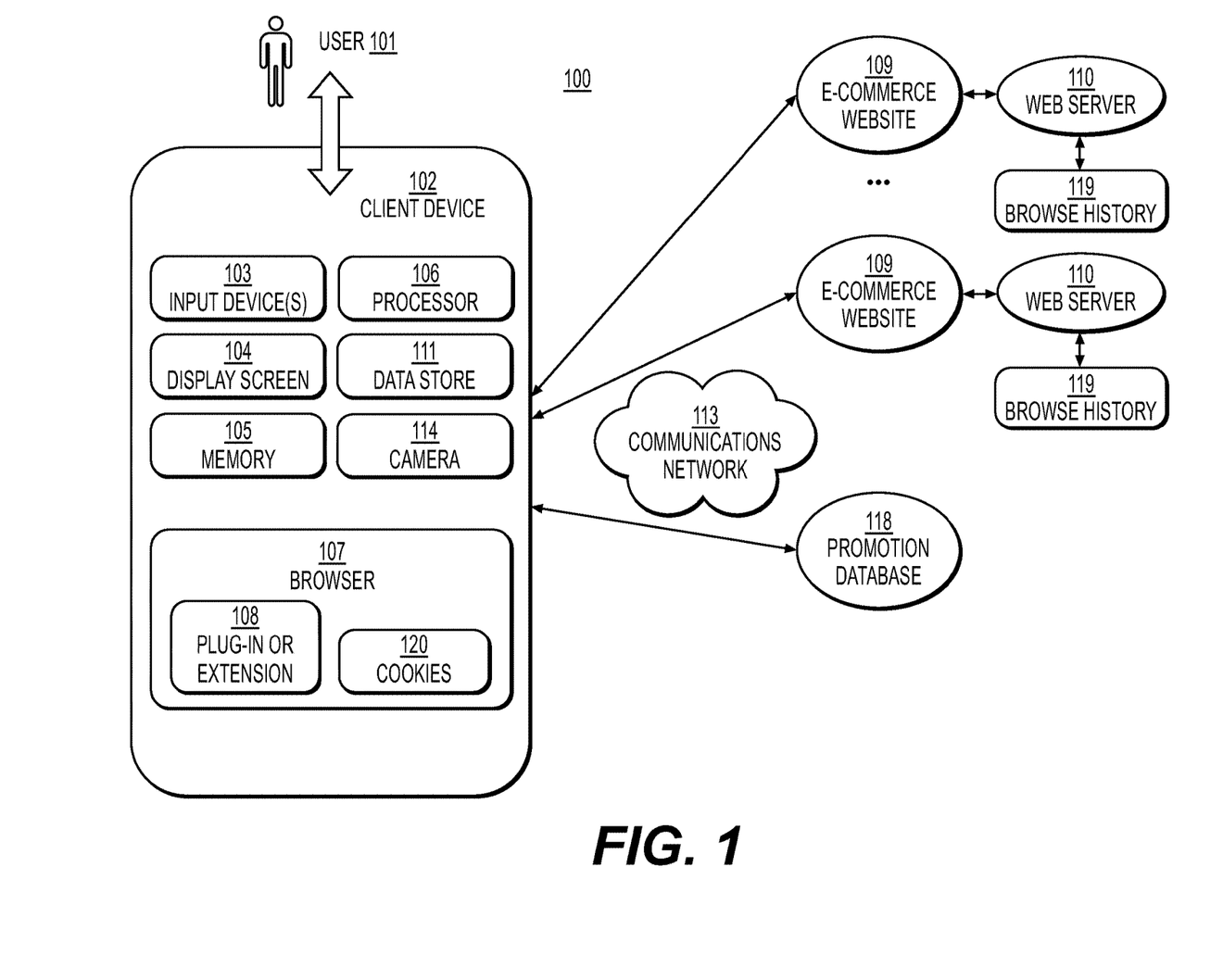
FIG. 1 is a block diagram depicting a system for automatically identifying offers that may be relevant to a user, based on the user's browse history at an e-commerce website, according to one embodiment.

Referring now to FIG. 1, there is shown a block diagram depicting a system 100 for automatically identifying offers (including deals and promotions) that may be relevant to a consumer such as user 101, based on user's 101 browse history 119 at an e-commerce website 109, according to one embodiment. As shown in FIG. 1, in at least one embodiment, the system is implemented in a client/server environment wherein at least one web server 110 receives and responds to requests from client device 102.

Client device 102 may be any electronic device equipped to receive, store, and/or present information, and to receive user input in connect with such information, such as a desktop computer, laptop computer, personal digital assistant (PDA), cellular telephone, smartphone, music player, handheld computer, tablet computer, kiosk, game system, smart watch, wearable device, or the like.

In at least one embodiment, client device 102 includes a number of hardware components well known to those skilled in the art.

Input device(s) 103 can be any element or elements capable of receiving input from user 101, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Processor 106 can be a conventional microprocessor for performing operations on data under the direction of software, according to well-known techniques.

Memory 105 can be random-access memory, having a structure and architecture as are known in the art, for use by processor 106 in the course of running software.

Browser 107 is an example of a software application that can be used by user 101 to access and interact with websites over communications network 113. In at least one embodiment, user 101 uses browser 107 to view and interact with e-commerce websites 109 operated by web servers 110. Such interaction can include, for example, clicking on links to view items, placing items in a shopping cart, and/or the like. In other embodiments, any suitable app (software application) or other component can be used in place of browser 107. In at least one embodiment, browser 107 maintains a set of cookies 120 that store state information for web pages visited by user 101, using techniques that are well known in the art; such cookies 120 can be stored in browser 107, or in data store 111, and/or in memory 105. Alternatively or additionally, cookies 120 can be stored remotely with respect to client device 102, and can be made accessible to other devices, including other client devices. Cookies 120 can be used to provide access to user's 101 browse history 119 at various websites 109, including user's 101 browse history 119 for a particular e-commerce website 109 and/or user's 101 browse history 119 over a plurality of different e-commerce websites 109. Browse history 119 can indicate activity during a single session or any number of sessions.

In at least one embodiment, the techniques described herein are implemented by plug-in or extension 108 running on browser 107. In other embodiments, plug-in/extension 108 can be omitted, and the functionality described herein and associated with plug-in/extension 108 can instead be performed by browser 107 itself, or any app (software application), operating system, or other component of client device 102.

In at least one embodiment, browser 107 and/or plug-in/extension 108 can access browse history 119 for any particular website 109 based on state data stored in cookies 120; this allows browse history 119 to be easily retrieved in future sessions, using techniques that are known in the art. In alternative embodiments, other techniques besides cookies 120 can be used to access browse history 119 and to maintain such information from one session to another.

In at least one embodiment, as described in more detail below, browser 107 and/or plug-in/extension 108 automatically extracts items from user's 101 browse history 119 for one or more websites 109, and searches these and/or other e-commerce websites 109 and sources for offers for those items that were browsed and/or for other related items. The searched e-commerce websites 109 and sources can include websites visited by user 101 and/or websites that user 101 has not visited.

Display screen 104 can be any element or component that graphically displays information such as items presented by browser 107, user interface elements, and/or the like. Such output may include, for example, descriptions and images depicting items that user 101 may be interested in purchasing, indications of coupons and discounts, navigational elements, search results, graphical elements, prompts, windows, buttons, forms, and/or the like. In at least one embodiment where only some of the desired output is presented at a time, a dynamic control, such as a scrolling mechanism, may be available via input device 103 to change which information is currently displayed, and/or to alter the manner in which the information is displayed.

In at least one embodiment, the information displayed on display screen 104 may include data in text and/or graphical form.

Data store 111 can be any magnetic, optical, or electronic storage device for data in digital form; examples include flash memory, magnetic hard drive, CD-ROM, DVD-ROM, thumbdrive, or the like. Data store 111 may be fixed or removable.

In at least one embodiment, device 102 can include additional components. For example, a camera 114 can be included, as is well known for devices such as smartphones. Additional input mechanisms, sensors, and/or devices, not shown in FIG. 1, can also be included in device 102, such as a speaker (for voice commands), accelerometer (to detect shaking and changes in position or orientation), GPS sensor (to detect location), and/or the like.

As mentioned above, FIG. 1 depicts an example of a system implementation in a client/server environment. An example of such a client/server environment is a web-based implementation, wherein client device 102 runs browser 107 that provides a user interface for interacting with e-commerce websites 109 and/or other web-based resources. Plug-in/extension 108 also automatically monitors user's 101 browsing behavior and initiates searches for offers based on such browsing behavior. In at least one embodiment, plug-in/extension 108 attempts to apply such offers, determines success or failure of such attempted application, and stores information about valid promotions and deals in database 118, which may be in local or remote data storage.

Information, images, and/or text from e-commerce websites 109 can be presented as part of such web pages and/or other web-based resources, using known protocols and languages such as Hypertext Markup Language (HTML), Java, JavaScript, and the like. Alternatively, such information, images, and/or text from e-commerce websites 109 can be presented by a software application (app) or other component running on client device 102.

In at least one embodiment, plug-in/extension 108 or other software application runs in the background no matter what browser or application user 101 is running. The background application can thereby see all traffic, and in particular can alert user 101 to offers that are applicable to items in user's 101 browse history.

Any suitable type of communications network 113, such as the Internet, can be used as the mechanism for transmitting data among components such as client device 102, web server(s) 110, e-commerce website(s) 109, and promotion database 118, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. Communications network 113 can be wired or wireless, or any combination thereof. Communications across network 113 can be encrypted or unencrypted. In at least one embodiment, client device 102 transmits requests for data via communications network 113, and receives responses from servers 110 and/or websites 109 containing the requested data.

In at least one embodiment, some components of system 100 can be implemented as software written in any suitable computer programming language. Alternatively, such components may be implemented and/or embedded in hardware.

Figure 2:
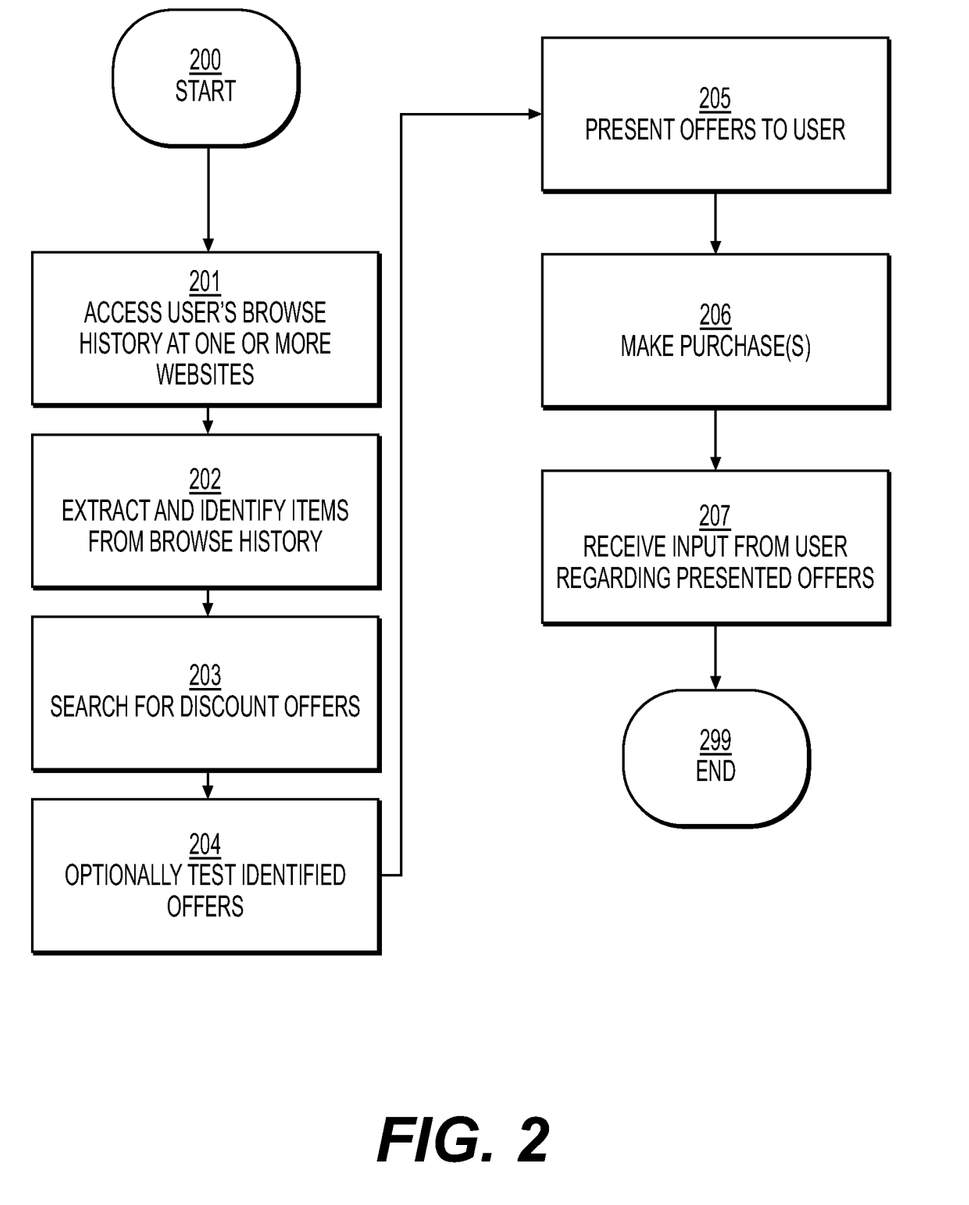
FIG. 2 is a flowchart depicting a method for automatically identifying offers that may be relevant to a user, based on the user's browse history at an e-commerce website, according to one embodiment.

Referring now to FIG. 2, there is shown a flowchart depicting a method for automatically identifying offers (including coupons, deals, and/or promotions) that may be relevant to user 101, based on user's 101 browse history at an e-commerce website 109, according to one embodiment.

In at least one embodiment, the method depicted in FIG. 2 can be performed using the architecture depicted in FIG. 1. However, one skilled in the art will recognize that the method can be performed using other architectures and arrangements.

In at least one embodiment, the described method is performed in connection with e-commerce shopping. More particularly, the method can be used in connection with a universal electronic shopping cart, as described in above-referenced U.S. Utility application Ser. No. 14/933,173, as well as in connection with techniques for automated testing of multiple online coupons, as described in above-referenced U.S. Utility application Ser. No. 15/677,951, and/or in connection with techniques for automatically storing coupon codes based on successful activation, as described in above-referenced U.S. Utility application Ser. No. 15/898,435. Alternatively, the described techniques can be implemented in other contexts.

In at least one embodiment, the method can be performed by plugin or extension 108 on browser 107 running on client device 102. Plug-in or extension 108 can be pre-installed before the steps described herein are performed. In other embodiments, the method can be performed by an app or by native functionality in browser 107 or in the operating system, or by a server such as one of web servers 110, or in other ways.

In various embodiments, promotion database 118, containing information about valid coupons, deals, and/or promotions, can be implemented locally or remotely with respect to client device 102. In at least one embodiment, promotion database 118 can be accessed by other client devices as well.

In at least one embodiment, the method operates in connection with e-commerce shopping. As discussed above, many e-commerce websites maintain each user's 101 browse history 119, keeping track of which products each user 101 has searched for, viewed, and/or placed in his or her shopping cart. Such information is tracked, for example, based on a unique identifier for each user 101. Such identifier can be linked to log-in information entered manually by user 101, and/or can be linked to an identifier extracted from a stored cookie 120 on device 102.

The method begins 200. User's 101 browse history 119 at one or more websites 109 is accessed 201. In at least one embodiment, this step is performed by providing an identifier for user 101 to each website 109, so as to gain access to user's 101 browse history 119, for example on a particular browse history page associated with website 109. The identifier can be obtained by prompting user 101 to enter a log-in and password, or by retrieving cookie 120, or by retrieving the identifier from some other location where it has been stored.

Next, items are automatically extracted and identified 202 from user's 101 browse history 119 at one or more e-commerce websites 109. These items can represent individual products that user 101 has browsed and/or product categories. In at least one embodiment, this step is performed by extracting product identifiers, such as vendor SKUs, for items in user's 101 browse history 119 as found in the product history page. In at least one embodiment, such extraction is performed using prepackaged code available from an Internet-based library or from a previously downloaded software application. The use of such code enables operations to be performed on an abstracted and conceptual basis without necessarily engaging in lower-level data and object manipulation. Optionally, the system can also identify items that are related to or correlated with products that user 101 has browsed.

Once these product identifiers have been obtained, the system automatically searches 203 for discount offers, which may include any coupons, deals, and/or promotions that are potentially applicable to the identified items, and/or promotions that may apply to other items or stores that may be of interest to user 101. This may include searching for identical or similar items at other e-commerce websites 109 to locate a better offer, and/or searching for applicable coupon codes or other promotions from online repositories and other sources.

More specifically, step 203 may include, for example, searching in available databases (such as promotion database 118), maintained at a central server or elsewhere, of promotions and/or deals for products that match the extracted product identifiers. Additionally or alternatively, any number of ecommerce websites 109 and/or coupon/promotion websites can be searched for relevant items and/or promotions for the identified items, and/or for other items and/or stores likely to be of interest to user 101. Such searches can be based on the names of the items, their SKU's, and/or any other identifying information.

In at least one embodiment, step 203 may include identifying, based on user's 101 browse history 119, at least one item or store likely to be of interest to user 101, and identifying one or more discount offers for the selected item or store. Thus, discount offers can be specific to particular items, or they may be applicable to websites or stores that are determined to be of likely interest to user 101 based on user's browse history 119.

In at least one embodiment, the system aggregates information from browse history 119 obtained from two or more websites 109, so as to generate an aggregated browse history that provides more complete information as to the products that interest user 101. Search step 203 can then be performed on such aggregated browse history.

In at least one embodiment, the search can be extended to items other than those extracted from browse history 119 (and/or from the aggregated browse history). For example, a recommendation engine can be used to determine what other items and/or stores may interest user 101, based on user's 101 browse history 119 (and/or aggregated browse history) and/or other factors. Such recommendation engine can use collaborative filtering or any other suitable technique for identifying items and/or stores that are likely to be of interest to user 101. Alternatively, the system can identify items that are frequently purchased with those items in user's 101 browse history 119 (and/or aggregated browse history), or those items that are frequently purchased by other purchasers of the items in user's 101 browse history 119 (and/or aggregated browse history). In at least one embodiment, the system can take into account the buying/shopping preferences of other users that are similar to user 101, either geographically, demographically, or in some other way, in identifying items likely to be of interest, using user's 101 browse history 119 (and/or aggregated browse history) as a starting point.

Searches for offers for such related items can then be performed automatically.

In at least one embodiment, the system can prioritize offers for identified items based on any suitable factor(s), such as for example: how recently user 101 viewed the item; how often user 101 viewed the item; whether user 101 placed the item in a shopping cart; whether user 101 attempted to buy the item; whether user 101 shopped for the item at multiple websites; whether user 101 searched for the item using a search engine; how popular the item is; how rare the item is; whether the item relates to other items previously purchased by user 101 or by similar users; and/or the like. The system can take into account such prioritizing when presenting offers for items, for example by presenting higher-priority items at the top of the display, or in some other more prominent way.

In at least one embodiment, the system can perform an optional step wherein any identified offers are tested 204 for validity, for example by automatically placing items in a shopping cart and attempting to apply the identified offers.

Once relevant offers (including coupons, deals, and/or promotions) have been identified (and optionally, tested), they are automatically presented 205 to user 101, for example by outputting promo codes or by otherwise providing access to discounted prices. In at least one embodiment, this may take place using any suitable browser plug-in or extension that presents a button, window, pane, or other user interface element allowing user 101 to instantly place items in a shopping cart or universal cart, using one or more of the identified offers. In this manner, user 101 can instantly purchase the item from a website that may not necessarily be the same website 109 at which browsing history 119 was stored. Techniques for purchasing items via such a universal cart are described in the above-cited related applications. Alternatively, the user interface element can take the user to any suitable e-commerce website for purchasing the item.

In at least one embodiment, the system automatically suggests purchases based on the identified offers, and/or can automatically (with permission) place items in user's 101 shopping cart and/or complete purchases, based on availability of a particular offer.

Alternatively or additionally, the system can automatically enter coupon codes and/or promotional codes that have been automatically identified as being relevant, without any need for user 101 to manually enter such codes. In this manner, any available discounts can be automatically applied.

In at least one embodiment, the system can automatically select among multiple sources (such as e-commerce websites) for identified items, based on price, reliability, delivery speed, availability of options, and/or any other relevant factors. The system can then automatically direct user 101 to the selected source for the item. Such techniques are further described in the above-cited related applications.

The system may then proceed with purchase(s) 206 using selected offer(s) (including deal(s) and/or promotion(s)), either based on user 101 input or automatically. In at least one embodiment, the system receives 207 input from user 101 as to whether the presented offers are appropriate or desirable suggestions for user 101. In at least one embodiment, the system takes such feedback into account in making future suggestions as to offers. For example, if user 101 has been browsing for a gift for another person, that browsing behavior can result in suggestions that are not applicable to user 101 him- or herself. Step 207 provides user 101 with an opportunity to provide feedback to indicate that he or she is not interested in future offers relating to such items, and the system can adjust its selection process accordingly so as to not identify offers for those items when making suggestions for that user 101.

In at least one embodiment, the above-described steps are performed by the system in a background context of plug-in/extension 108, so that user's 101 browse history 119 for a number of e-commerce websites 109 can be automatically gathered without interrupting or distracting user 101 from his or her shopping activities. In at least one embodiment, plug-in/extension 108 automatically obtains browse history 119 for user 101 by accessing a browse history page associated with e-commerce website 109. As described above, a cookie 120 or other tracking information can be used to access browse history 119 automatically, without necessarily requiring user 101 to activate such an operation or to enter any identifying or authenticating information. If such cookie 120 or other tracking information is not available (for example if user 101 has disabled cookies 120 on browser 107), or if further authentication is needed, the system can prompt user 101 for any needed information and/or authentication information.

In at least one embodiment, the above-described method is automatically performed periodically, or whenever a user browses for items at an ecommerce website, or in response to any other trigger event. In another embodiment, the method is performed in response to user 101 clicking on a link or a button to initiate the process of looking for offers related to items in his or her browse history 119.

In at least one embodiment, the above-described method can be optionally combined with automatic coupon testing, such as described in the above-referenced related applications.

Figure 3:
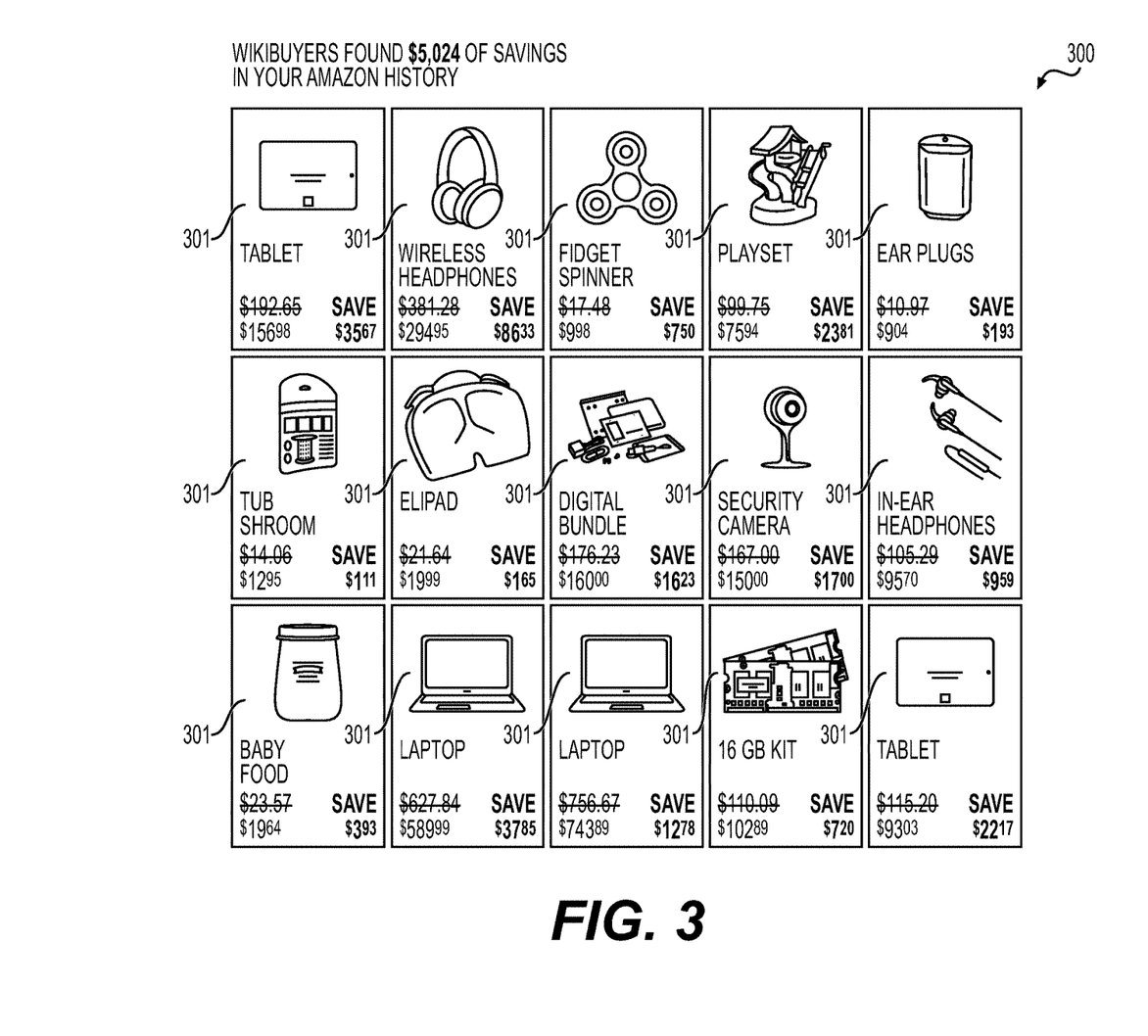
FIGS. 3 to 5 are examples of screen shots depicting results generated by the techniques described herein, according to various embodiments.

Referring now to FIG. 3, there is shown an example of a screen shot 300 depicting results generated by the techniques described herein. In this example, the system has extracted a number of items 301 from user's 101 browse history 119 at Amazon.com, and has identified other sources that have better prices. The results are displayed in visual format. In at least one embodiment, user 101 can click on any of the displayed items 301 to see more information or to purchase the item 301 from the alternate source, automatically taking advantage of any applicable offers.

In addition, some or all of displayed items 301 may not necessarily be extracted from user's 101 browse history 119, but may instead be items that are determined to be of possible or likely interest to user 101, for example based on past shopping history, behavior, browsing, or the like. For example, collaborative filtering or some other automated recommendation technique can be used to determine, based on past shopping and/or browsing history, which items and/or offers are likely to be of interest to user 101, and those items and/or offers can then be displayed.

Figure 4:
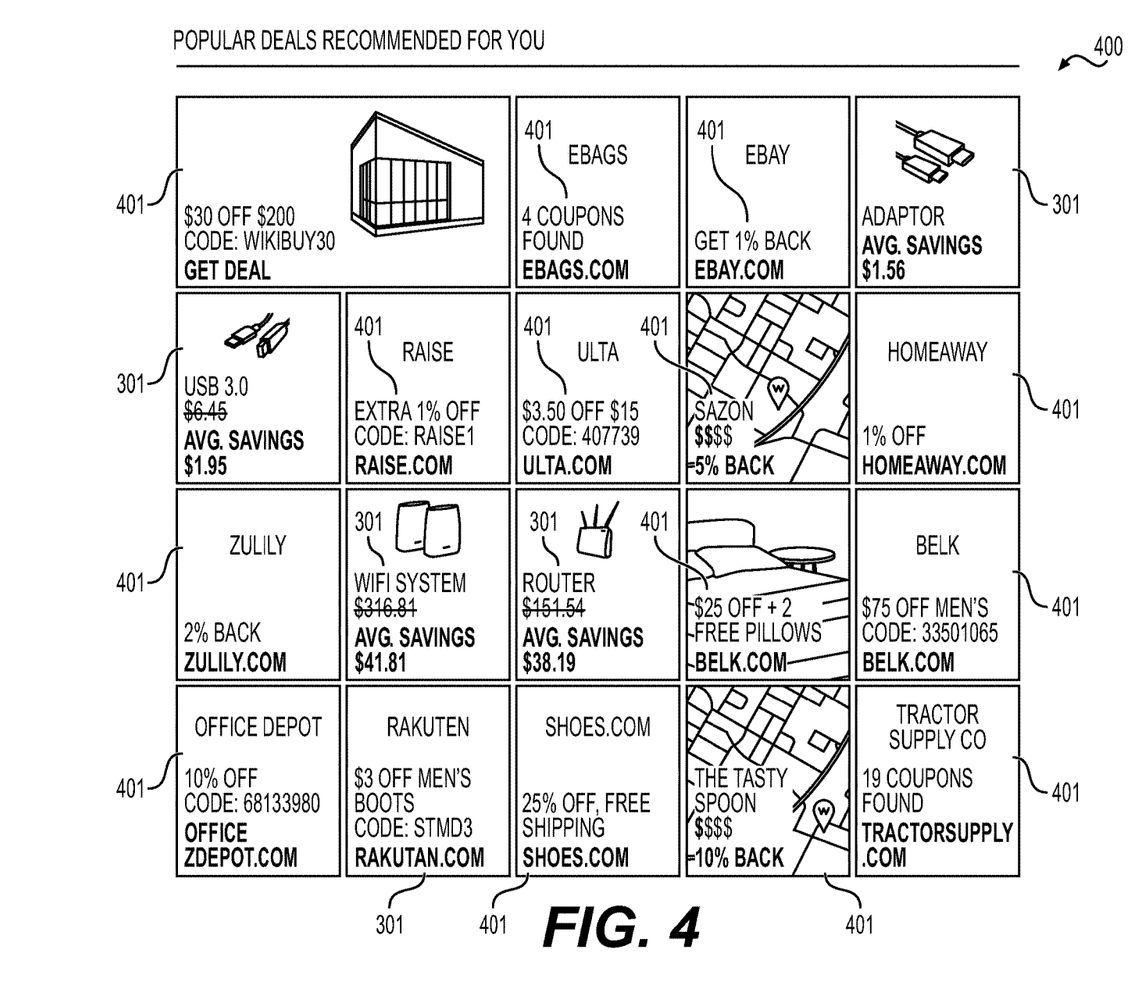
Figure 5:
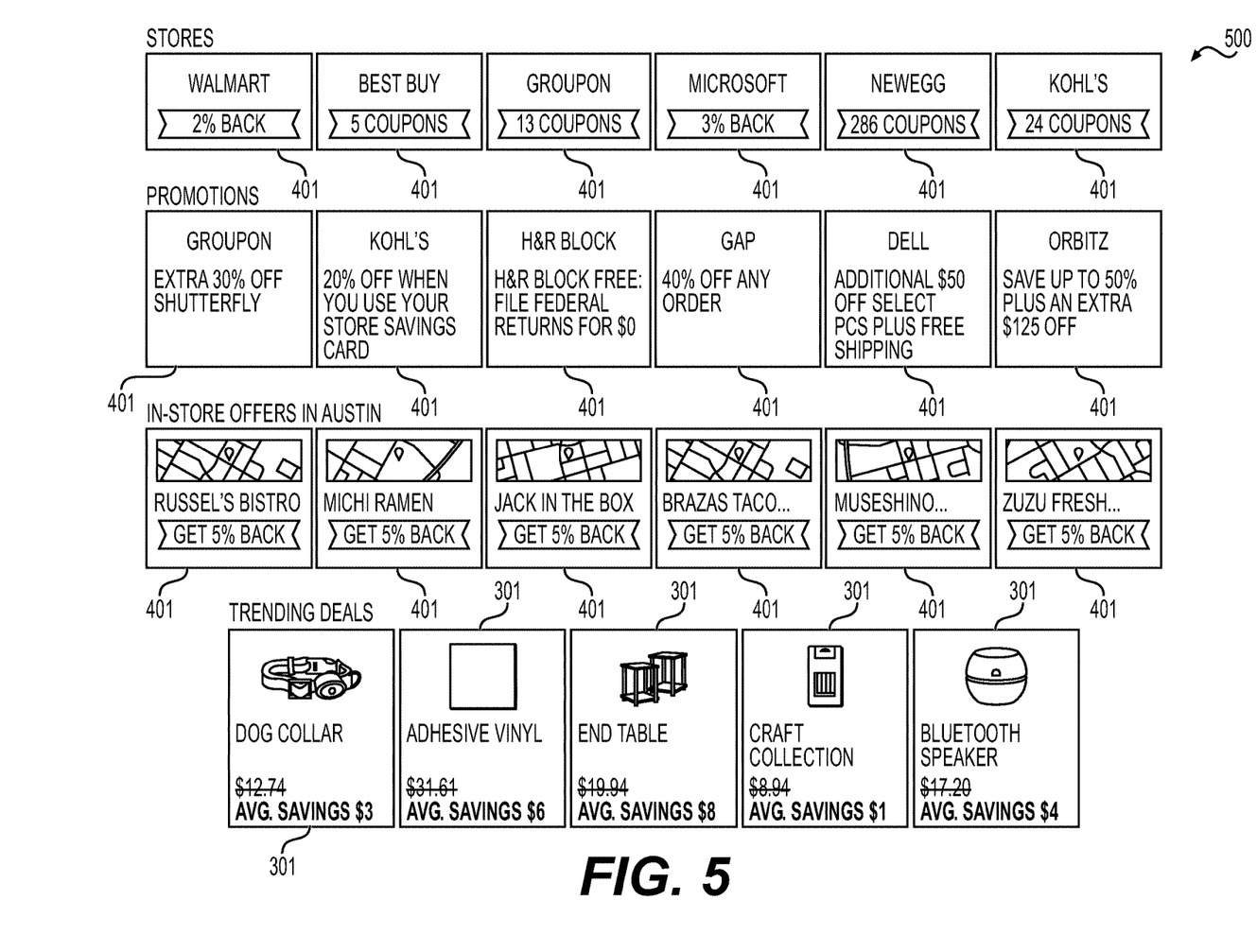

Referring now to FIG. 4, there is shown another example of a screen shot 400 depicting results generated by the techniques described herein. In this example, in addition to display of opportunities to purchase particular extracted items 301 from user's 101 browse history 119, the display also includes more general offers 401 that may be of interest to user 101, such as discount offers or promotions for a store or website. Such general offers 401 can be identified and displayed based on past shopping and/or browsing history of user 101, and/or on other factors. General offers 401 can include promotions for particular websites or merchants, or they can be applicable to items in user's 101 browse history. General offers 401 can be displayed alongside items 301 (as in FIG. 4), or they can be displayed separately. Referring now to FIG. 5, there is shown an example of a screen shot 500 where general offers 401 are shown in one part of the screen, while opportunities to purchase particular extracted items 301 are shown in another part of the screen.

One skilled in the art will recognize that FIGS. 3 to 5 depict examples only; in other embodiments, other layouts and displays can be used.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in at least one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for automatically identifying and presenting e-commerce offers to a user based on browse history, comprising:
    at a processor, accessing a user's browse history in connection with at least one e-commerce website visited by the user during a previous browsing session via a browser operating on a user device associated with the user, wherein accessing the user's browse history includes using an electronic application operating in conjunction with the browser on the user device, in a background operating context that is configured not to interrupt a current browsing session of the browser, to:
        obtain an identifier associated with the user that is stored on the user device and that corresponds to the at least one e-commerce website; and
        provide the identifier to the corresponding at least one e-commerce website so as to access browse history data stored by the at least one e-commerce website, the browse history data including the user's browse history;
    at the processor, extracting at least one record from the browse history;
    at the processor, identifying at least one browsed item from the extracted record;
    at the processor, searching for at least one discount offer associated with the at least one browsed item; and
    causing the electronic application to present the at least one discount offer to the user.

2. The computer-implemented method of claim 1, further comprising:
    receiving, via the electronic application, input from the user via the user device to buy the at least one item; and
    at the processor, responsive to receiving the input from user to buy the at least one item, initiating an e-commerce transaction to buy the at least one item using the at least one discount offer.

3. The computer-implemented method of claim 1, further comprising:
    at the processor, automatically initiating an e-commerce transaction to buy the at least one item using the at least one discount offer.

4. The computer-implemented method of claim 1, wherein:
    the at least one discount offer includes a plurality of discount offers;
    the method further comprises, at the processor, prior to causing the electronic application to present the at least one discount offer to the user, automatically determining a priority order for the at least one discount offer; and
    presenting the at least one discount offer to the user includes presenting the at least one discount offer according to the determined priority order.

5. The computer-implemented method of claim 4, wherein the priority order is determined based on at least one selected from the group consisting of:
    how recently the user viewed the item associated with each offer;
    how often the user viewed the item associated with each offer;
    whether the user placed the item associated with each offer in a shopping cart;
    whether the user attempted to buy the item associated with each offer;
    whether the user has shopped for the item associated with each offer at multiple websites;
    whether the user has searched for the item associated with each offer using a search engine;
    popularity of the item associated with each offer;
    rarity of the item associated with each offer;
    a degree to which the item associated with each offer relates to other items previously purchased by the user; and
    a degree to which the item associated with each offer relates to other items previously purchased by other users similar to the user.

6. The computer-implemented method of claim 1, further comprising:
    at the processor, prior to causing the electronic application to present the at least one discount offer to the user, automatically filtering the at least one discount offer;
    wherein presenting the at least one discount offer to the user comprises presenting the filtered at least one discount offer.

7. The computer-implemented method of claim 6, wherein the filtering is performed based on at least one selected from the group consisting of:
    how recently the user viewed the item associated with each offer;
    how often the user viewed the item associated with each offer;
    whether the user placed the item associated with each offer in a shopping cart;
    whether the user attempted to buy the item associated with each offer;
    whether the user has shopped for the item associated with each offer at multiple websites;
    whether the user has searched for the item associated with each offer using a search engine;
    popularity of the item associated with each offer;
    rarity of the item associated with each offer;
    a degree to which the item associated with each offer relates to other items previously purchased by the user; and
    a degree to which the item associated with each offer relates to other items previously purchased by other users similar to the user.

8. The computer-implemented method of claim 1, further comprising:
  receiving, via the electronic application, input from the user that includes feedback regarding the at least one discount offer.

9. The computer-implemented method of claim 1, wherein:
  the at least one discount offer includes a plurality of discount offers;
  the method further comprises, at the processor, prior to causing the electronic application to present the at least one discount offer to the user, automatically determining, based at least partially on feedback received from the user regarding at least one previously presented discount offer, a priority order for the at least one discount offer; and
  presenting the at least one discount offer to the user includes presenting the at least one discount offer according to the determined priority order.

10. The computer-implemented method of claim 1, further comprising:
  at the processor, prior to causing the electronic application to present the at least one discount offer to the user, automatically filtering, based at least partially on feedback received from the user regarding at least one previously presented discount offer, the at least one discount offer;
  wherein presenting the at least one discount offer to the user includes presenting the filtered at least one discount offer.

11. The computer-implemented method of claim 1, wherein accessing a user's browse history in connection with at least one e-commerce website visited by the user during a previous browsing session includes accessing a user's browse history in connection with a plurality of e-commerce websites visited by the user during a previous browsing session, the method further comprising:
  aggregating the user's browse history from the plurality of e-commerce websites;
  wherein extracting at least one record from the browse history comprises extracting at least one record from the aggregated browse history.

12. The computer-implemented method of claim 1, wherein each discount offer comprises at least one selected from the group consisting of:
  an offer to sell the browsed item from a different e-commerce website at a competitive price;
  an offer to sell an item associated with the browsed item from a different ecommerce website at a competitive price;
  a promotion; and
  a coupon code.

13. The computer-implemented method of claim 1, wherein searching for at least one discount offer associated with the at least one browsed item comprises:
  based on the user's browse history, selecting at least one item likely to be of interest to the user; and
  identifying at least one discount offer for the selected item.

14. The computer-implemented method of claim 13, wherein selecting at least one item likely to be of interest to the user comprises using a recommendation engine to identify at least one item related to at least one browsed item.

15. The computer-implemented method of claim 13, wherein selecting at least one item likely to be of interest to the user comprises at least one selected from the group consisting of:
  identifying at least one item frequently purchased with at least one browsed item; and
  identifying at least one item frequently purchased by purchasers of the at least one browsed item.

16. The computer-implemented method of claim 1, wherein searching for at least one discount offer associated with the at least one browsed item comprises:
  based on the user's browse history, selecting at least one store likely to be of interest to the user; and
  identifying at least one discount offer for the selected store.

17. The computer-implemented method of claim 16, wherein selecting at least one store likely to be of interest to the user comprises using a recommendation engine to identify at least one store related to at least one browsed item.

18. The computer-implemented method of claim 16, wherein selecting at least one store likely to be of interest to the user comprises at least one selected from the group consisting of:
  identifying at least one store that sells the at least one browsed item; and
  identifying at least one store that is frequently visited by purchasers of the at least one browsed item.

19. The computer-implemented method of claim 1, wherein at least one discount offer comprises a coupon code, the method further comprising:
  at the processor, testing the at least one coupon code;
  wherein presenting the at least one discount offer to the user is performed responsive to the testing step indicating that the coupon code is valid and applicable in connection with the at least one browsed item.

20. The computer-implemented method of claim 1, wherein:
  the extracting, identifying, searching, and presenting steps are performed by the electronic application; and
  the electronic application is a plug in of the browser.

21. The computer-implemented method of claim 1, wherein:
  the extracting, identifying, searching, and presenting steps are performed by the electronic application; and
  the electronic application is a browser extension of the browser.

22. The computer-implemented method of claim 1, wherein the accessing, extracting, identifying, searching, and presenting steps are performed in response to receiving, via the electronic application, input from the user to initiate a process of automatically identifying e-commerce offers.

23. The computer-implemented method of claim 1, further comprising:
  monitoring, via the electronic application, user behavior of the user with the browser in an e-commerce shopping environment, wherein the accessing, extracting, identifying, searching, and presenting steps are performed in response to a trigger event based on the monitoring.

24. The computer-implemented method of claim 23, wherein the trigger event includes at least one selected from the group consisting of:
  the user shopping for an item;
  the user placing an item in a shopping cart;
  the user viewing a description of an item; and
  the user performing an online search for an item.

25. A non-transitory computer-readable medium for automatically identifying and presenting e-commerce offers to a user based on browse history, comprising instructions stored thereon, that when executed by one or more processors, perform the steps of:

accessing a user's browse history in connection with at least one e-commerce website visited by the user during a previous browsing session via a browser operating on a user device associated with the user, wherein accessing the user's browse history includes using an electronic application operating in conjunction with the browser on the user device, in a background operating context that is configured not to interrupt a current browsing session of the browser, to:
  obtain an identifier associated with the user that is stored on the user device and that corresponds to the at least one e-commerce website; and
  provide the identifier to the corresponding at least one ecommerce website so as to access a browse history page associated with the at least one e-commerce website, the browse history page including the user's browse history;
extracting at least one record from the browse history;
identifying at least one browsed item from the extracted record;
searching for at least one discount offer associated with the at least one browsed item;
testing a respective validity of the at least one discount offer by placing a respective item associated with the at least one offer in a shopping cart of a respective e-commerce website associated with the at least one offer and attempting to apply the at least one discount offer to the respective item; and
causing the electronic application to present the at least one discount offer to the user.

26. The non-transitory computer-readable medium of claim 25, further comprising instructions stored thereon, that when executed by one or more processors, perform the step of:
  responsive to receiving, via the electronic application, input from user via the user device to buy the at least one item, initiating an e-commerce transaction to buy the at least one item using the at least one discount offer.

27. The non-transitory computer-readable medium of claim 25, further comprising instructions stored thereon, that when executed by one or more processors, perform the step of:
  at the processor, prior to presenting the at least one discount offer to the user, automatically determining a priority order for the at least one discount offer;
  wherein:
    the at least one discount offer includes a plurality of discount offers; and
    presenting the at least one discount offer to the user comprises presenting the at least one discount offer according to the determined priority order.

28. The non-transitory computer-readable medium of claim 25, further comprising instructions stored thereon, that when executed by one or more processors, perform the step of:
  at the processor, prior to presenting the at least one discount offer to the user, automatically filtering the at least one discount offer;
  wherein presenting the at least one discount offer to the user comprises presenting the filtered at least one discount offer.

29. The non-transitory computer-readable medium of claim 25, wherein accessing a user's browse history in connection with at least one ecommerce website visited by the user during a previous browsing session comprises accessing a user's browse history in connection with a plurality of e-commerce websites visited by the user during a previous browsing session, the non-transitory computer-readable medium further comprising instructions stored thereon, that when executed by one or more processors, perform the step of:
  aggregating the user's browse history from the plurality of e-commerce websites;
  and wherein extracting at least one record from the browse history comprises extracting at least one record from the aggregated browse history.

30. The non-transitory computer-readable medium of claim 25, wherein each discount offer comprises at least one selected from the group consisting of:
  an offer to sell the browsed item from a different e-commerce website at a competitive price;
  an offer to sell an item associated with the browsed item from a different ecommerce website at a competitive price;
  a promotion; and
  a coupon code.

31. The non-transitory computer-readable medium of claim 25, wherein searching for at least one discount offer associated with the at least one browsed item comprises:
  based on the user's browse history, selecting at least one item likely to be of interest to the user; and
  identifying at least one discount offer for the selected item.

32. The non-transitory computer-readable medium of claim 25, wherein searching for at least one discount offer associated with the at least one browsed item comprises:
  based on the user's browse history, selecting at least one store likely to be of interest to the user; and
  identifying at least one discount offer for the selected store.

33. The non-transitory computer-readable medium of claim 25, wherein:
  the extracting, identifying, searching, and presenting steps are performed by the electronic application; and
  the electronic application includes at least one of a plug-in of a browser application running on the user device or a browser extension running on the user device.

34. A system for automatically identifying and presenting ecommerce offers to a user based on browse history, comprising:
  a user device; and
  a processor, configured to perform the steps of:
    accessing a user's browse history in connection with at least one ecommerce website visited by the user during a previous browsing session via a browser operating on the user device associated with the user, wherein accessing the user's browse history includes using an electronic application operating in conjunction with the browser on the user device, in a background operating context that is configured not to interrupt a current browsing session of the browser, to:
      obtain an identifier associated with the user that is stored on the user device and that corresponds to the at least one e-commerce website; and
      provide the identifier to the corresponding at least one ecommerce website so as to access browse history data stored by the at least one ecommerce website, the browse history data including the user's browse history;
    extracting at least one record from the browse history;
    identifying at least one browsed item from the extracted record; and searching for a plurality of discount offers associated with the at least one browsed item, wherein the plurality of offers includes discount offers from a plurality of different sources;

selecting a particular source from amongst the plurality of different sources;

wherein the user device is communicatively coupled to the processor, and is configured to present at least one discount offer associated with the selected particular source to the user.

35. The system of claim 34, wherein the processor is further configured to, responsive to the user device receiving input from user to buy the at least one item, initiate an e-commerce transaction to buy the at least one item using the at least one discount offer.

36. The system of claim 34, wherein:

the at least one discount offer includes a plurality of discount offers;

the processor is further configured to, prior to presenting the at least one discount offer to the user, automatically determine a priority order for the at least one discount offer; and presenting the at least one discount offer to the user comprises presenting the at least one discount offer according to the determined priority order.

37. The system of claim 34, wherein:

the processor is further configured to, prior to presenting the at least one discount offer to the user, automatically filter the at least one discount offer; and presenting the at least one discount offer to the user comprises presenting the filtered at least one discount offer.

38. The system of claim 34, wherein:

accessing a user's browse history in connection with at least one e-commerce website visited by the user during a previous browsing session includes accessing a user's browse history in connection with a plurality of e-commerce websites visited by the user during a previous browsing session;

the processor is further configured to aggregate the user's browse history from the plurality of e-commerce websites; and extracting at least one record from the browse history comprises extracting at least one record from the aggregated browse history.

39. The system of claim 34, wherein each discount offer comprises at least one selected from the group consisting of:

an offer to sell the browsed item from a different e-commerce website at a competitive price;

an offer to sell an item associated with the browsed item from a different ecommerce website at a competitive price;

a promotion; and a coupon code.

40. The system of claim 34, wherein searching for at least one discount offer associated with the at least one browsed item comprises:

based on the user's browse history, selecting at least one item likely to be of interest to the user; and identifying at least one discount offer for the selected item.

41. The system of claim 34, searching for at least one discount offer associated with the at least one browsed item comprises:

based on the user's browse history, selecting at least one store likely to be of interest to the user; and identifying at least one discount offer for the selected store.

42. The system of claim 34, wherein:

the processor is configured to perform the steps of extracting, identifying, searching, and presenting under the control of the electronic application; and the electronic application includes at least one of a plug-in of a browser application running on the user device or a browser extension running on the user device.

* * * * *